United States Patent
Steiner et al.

(10) Patent No.: US 11,261,921 B2
(45) Date of Patent: Mar. 1, 2022

(54) HYBRID MODULE COOLING FLOW

(71) Applicant: Schaeffler Technologies AG & Co. KG, Herzogenaurach (DE)

(72) Inventors: Micah Steiner, Smithville, OH (US); Matthew Payne, Glenmont, OH (US); Patrick Lindemann, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 119 days.

(21) Appl. No.: 16/794,541

(22) Filed: Feb. 19, 2020

(65) Prior Publication Data
US 2021/0254671 A1 Aug. 19, 2021

(51) Int. Cl.
*F16D 13/72* (2006.01)
*H02K 9/19* (2006.01)
*F16D 13/54* (2006.01)

(52) U.S. Cl.
CPC ............ *F16D 13/72* (2013.01); *F16D 13/54* (2013.01); *H02K 9/19* (2013.01)

(58) Field of Classification Search
CPC .................. F16D 13/72; F16D 25/123; F16D 2300/0214; H02K 9/19
See application file for complete search history.

(56) References Cited

U.S. PATENT DOCUMENTS

| | | | |
|---|---|---|---|
| 9,266,419 B2* | 2/2016 | Iwase | B60K 6/54 |
| 2012/0217825 A1* | 8/2012 | Kasuya | H02K 7/083 |
| | | | 310/54 |
| 2012/0242199 A1 | 9/2012 | Iwase et al. | |
| 2020/0040974 A1 | 2/2020 | Payne et al. | |
| 2020/0040976 A1 | 2/2020 | Steiner et al. | |

FOREIGN PATENT DOCUMENTS

| | | |
|---|---|---|
| JP | 2007186088 A | 7/2007 |
| JP | 2014033602 A | 2/2014 |
| WO | 2011108770 A1 | 9/2011 |
| WO | 2020028464 A1 | 2/2020 |

* cited by examiner

*Primary Examiner* — Huan Le
(74) *Attorney, Agent, or Firm* — Kevin Parks

(57) ABSTRACT

A hybrid module housing includes a bulkhead. The bulkhead has a first radial channel for providing a clutch apply pressure, a second radial channel for providing a clutch cooling flow, and a third radial channel for providing a motor cooling flow. In an example embodiment, the third radial channel is arranged to be on a bottom half of the hybrid module housing when the hybrid module housing is installed in a vehicle. In an example embodiment, the first radial channel and the second radial channel are open at a radially outer surface of the bulkhead, and the third radial channel is sealed at the radially outer surface of the bulkhead. In an example embodiment, the third radial channel includes an axial passage open at a radial wall of the bulkhead.

19 Claims, 3 Drawing Sheets

HYBRID MODULE COOLING FLOW

TECHNICAL FIELD

The present disclosure relates generally to a hybrid module, and more specifically to hybrid module cooling flow.

BACKGROUND

Hybrid modules are known. One example is shown in commonly-assigned U.S. patent application Ser. No. 16/527,329 titled HYBRID MODULE, hereby incorporated by reference as if set forth fully herein.

SUMMARY

Example aspects broadly comprise a hybrid module housing with a bulkhead. The bulkhead has a first radial channel for providing a clutch apply pressure, a second radial channel for providing a clutch cooling flow, and a third radial channel for providing a motor cooling flow. In an example embodiment, the third radial channel is arranged to be on a bottom half of the hybrid module housing when the hybrid module housing is installed in a vehicle. In an example embodiment, the first radial channel and the second radial channel are open at a radially outer surface of the bulkhead, and the third radial channel is sealed at the radially outer surface of the bulkhead. In an example embodiment, the third radial channel includes an axial passage open at a radial wall of the bulkhead.

Other example aspects broadly comprise a hybrid module with the hybrid module housing and a clutch shaft sealed to the bulkhead. In an example embodiment, the hybrid module has a bearing radially supporting the clutch shaft on the hybrid module housing. In an example embodiment, the clutch shaft has a shaft channel in fluid communication with the third radial channel. In some example embodiments, the hybrid module has an outer clutch carrier and a bushing disposed radially between the outer clutch carrier and the clutch shaft. In an example embodiment, the bushing has a flow groove forming a portion of a flow path connecting the second radial channel to the third radial channel. In an example embodiment, the clutch shaft has an inner clutch carrier and a gap between the outer clutch carrier and the inner clutch carrier forms a portion of a flow path connecting the second radial channel to the third radial channel.

Other example aspects broadly comprise a hybrid module with the hybrid module housing and an electric motor rotor. The third radial channel has an axial passage open at a radial wall of the bulkhead and radially proximate the electric motor rotor. In an example embodiment, the electric motor rotor has a radially inwardly extending rim disposed radially outside of the axial passage. In an example embodiment, the hybrid module has an electric motor stator arranged radially outside of the electric motor rotor and fixed to the hybrid module housing.

Other example aspects broadly comprise a cooling circuit for a hybrid module including a first flow path providing a fluid to a clutch pack, and a second flow path providing the fluid from the clutch pack to an electric motor. In an example embodiment, the second flow path has an axial passage radially proximate the electric motor. In an example embodiment, the cooling circuit includes a third flow path fluidically connecting the first flow path and the second flow path and at least partially formed by an outer clutch carrier and an inner clutch carrier. In an example embodiment, the third flow path includes a groove in a bushing. In some example embodiments, the third flow path includes an axial passage formed in a clutch shaft and a radial passage formed in the clutch shaft. In an example embodiment, the radial passage is axially aligned with the second flow path.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
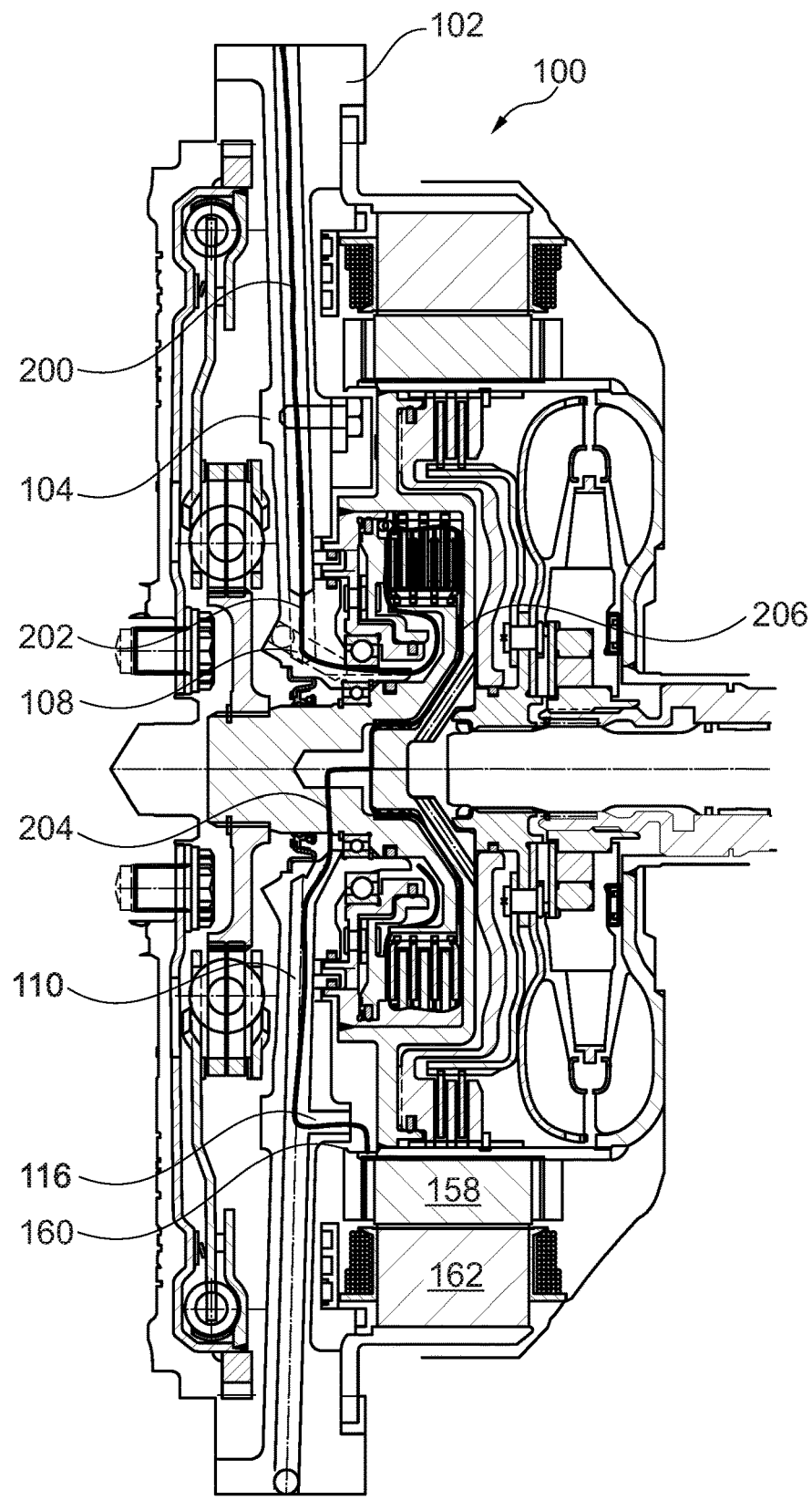
FIG. 1 illustrates a cross-sectional view of a hybrid module showing a cooling flow path according to an example embodiment.
Figure 2:
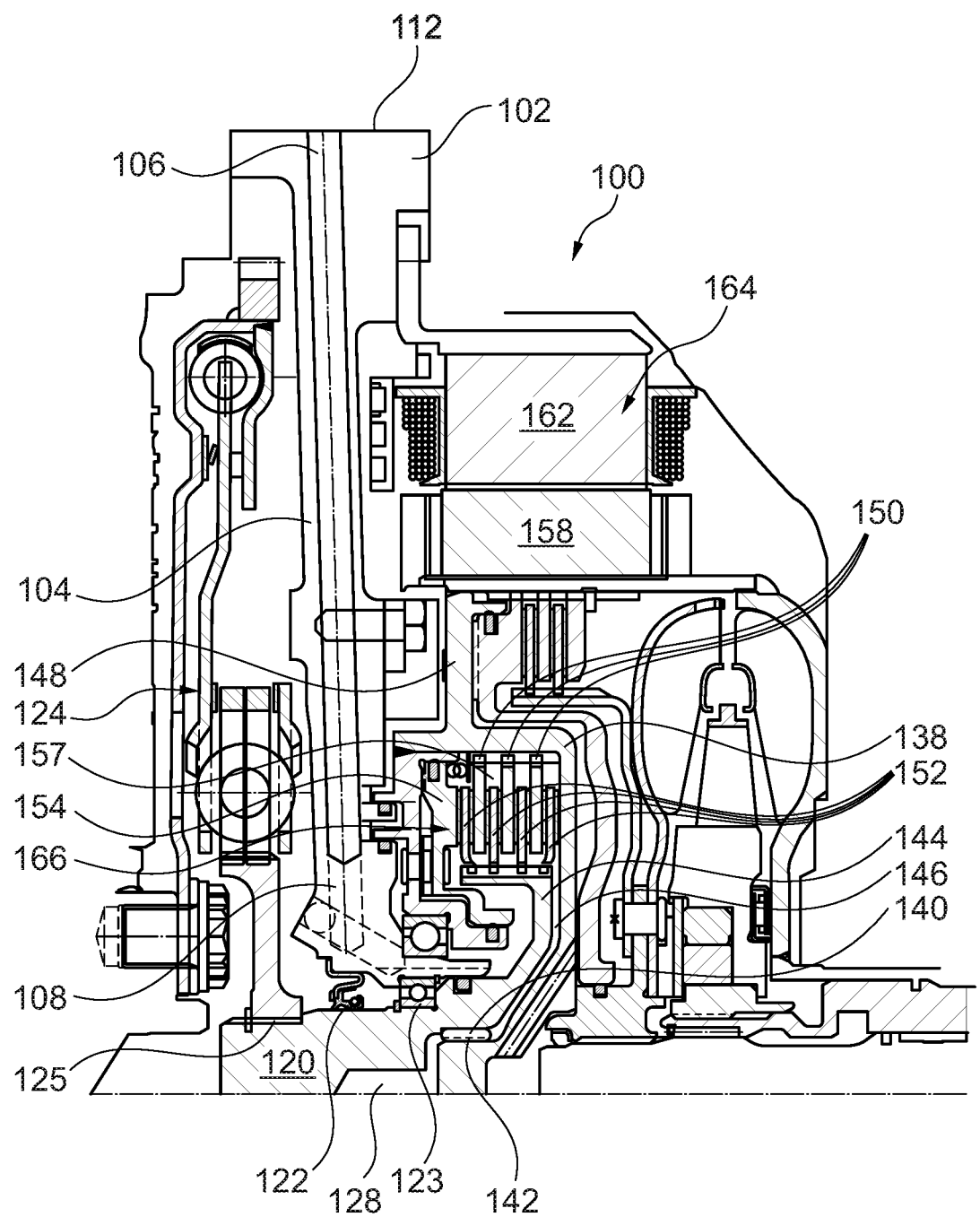
FIG. 2 illustrates a top half cross-sectional view of the hybrid module of FIG. 1.
Figure 3:
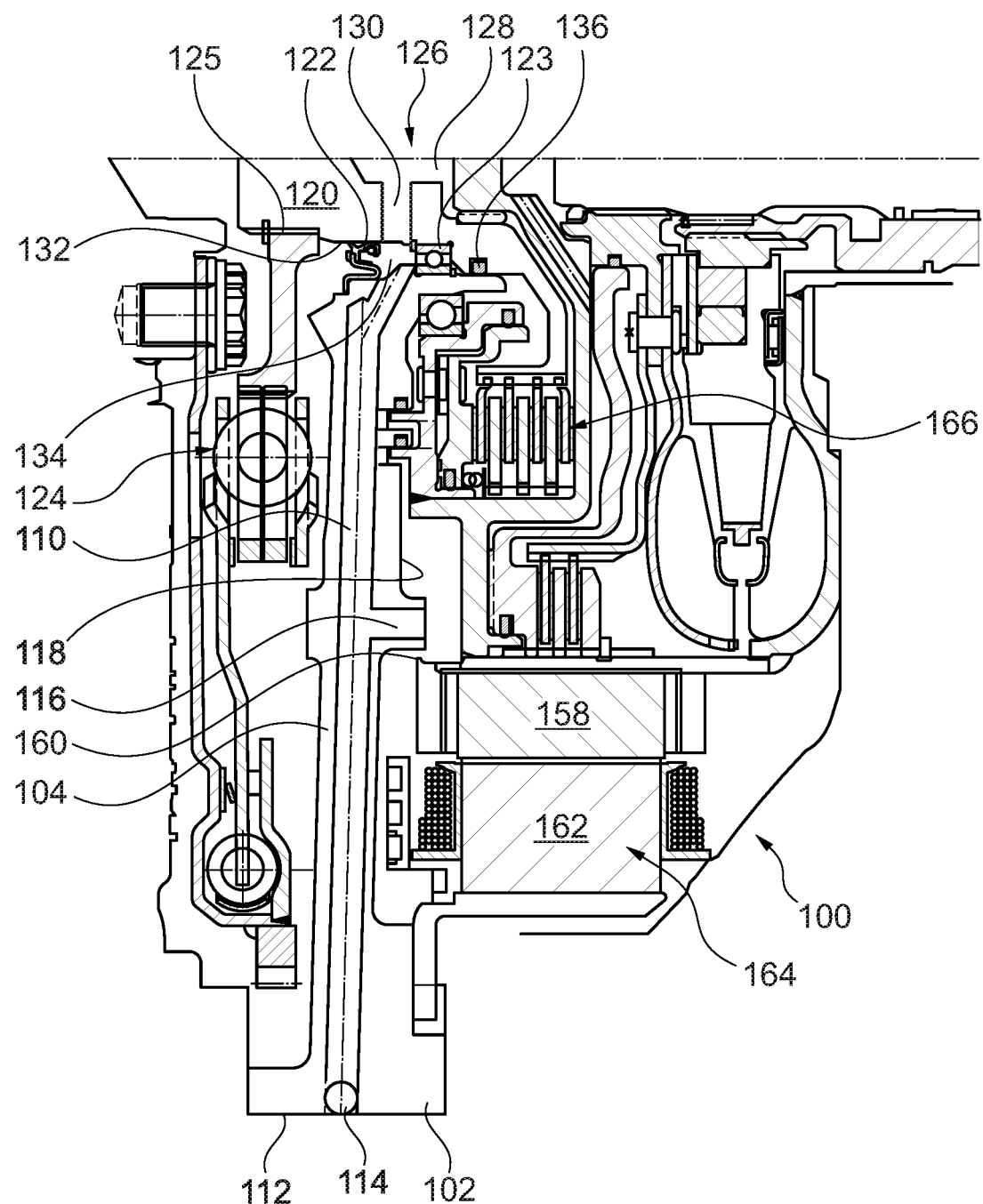
FIG. 3 illustrates a bottom half cross-sectional view of the hybrid module of FIG. 1.

The following description is made with reference to FIGS. 1-3. FIG. 1 illustrates a cross-sectional view of hybrid module 100 showing cooling flow path 200 according to an example embodiment. FIG. 2 illustrates a top half cross-sectional view of hybrid module 100 of FIG. 1. FIG. 3 illustrates a bottom half cross-sectional view of hybrid module 100 of FIG. 1.

Hybrid module 100 includes housing 102 with bulkhead 104. Bulkhead 104 includes radial channel 106 for providing a clutch apply pressure, radial channel 108 (shown in dashed lines) for providing a clutch cooling (and dynamic balancing) flow, and radial channel 110 for providing a motor cooling flow. Radial channel 110 is arranged to be on a bottom half of hybrid module housing 102 when the hybrid module housing is installed in a vehicle (not shown). That is, when installed in a vehicle, housing 102 is oriented as shown in FIGS. 1-3 and channel 110 is on a bottom half so that a cooling oil entering the channel flows down the channel (as shown in FIG. 3) due to gravity.

As can be seen in FIG. 2, radial channel 106 and radial channel 108 are open at radially outer surface 112 of the bulkhead. In other words, the channels extend through surface 112 and can be connected to a flow source (not shown) via appropriate hydraulic fittings (not shown), for example. As shown in FIG. 3, radial channel 110 is sealed by plug 114 at radially outer surface 112. Radial channel 110 includes axial passage 116 open at radial wall 118 of the bulkhead. In other words, plug 114 prevents oil from leaking out of channel 110 such that oil will fill the channel until the oil level reaches axial passage 116 and flow axially as described in more detail below.

Hybrid module 100 includes clutch shaft 120 sealed to bulkhead 104 at seal 122 and bearing 123 radially supporting the clutch shaft on hybrid module housing 102. Damper 124 is drivingly engaged with shaft 120 at spline 125. Shaft 120 includes shaft channel 126 in fluid communication with radial channel 110 (as seen in FIG. 1). In the example embodiment shown, shaft channel 126 includes an axial portion 128 formed as a bore into the shaft, and radial hole 130 extending from outer surface 132 to the bore. Oil from the shaft enters channel 110 from chamber 134 formed partially by seal 122 and bearing 123. Chamber 134 is further sealed by seal 136 between housing 102 and shaft 120.

Hybrid module 100 includes outer clutch carrier 138 and bushing 140 disposed radially between the outer clutch carrier and the clutch shaft. Bushing 140 includes flow groove 142 forming a portion of flow path 200 connecting the radial channel 108 to radial channel 110 (ref. FIG. 1). Clutch shaft 120 includes inner clutch carrier 144 and gap 146 between the outer clutch carrier and the inner clutch carrier forms a portion of flow path 200 connecting radial channel 108 to radial channel 110.

Outer clutch carrier 138 is a portion of rotor carrier 148 supporting clutch plates 150. Inner clutch carrier 144 supports clutch plates 152. Pressure introduced through radial channel 106 applies piston 154 to clamp clutch plates 150 and 152 and frictionally connect the clutch shaft to the rotor carrier for torque transmission between a combustion engine (connected to damper 124 at bolt 156) and rotor carrier 148. Fluid introduced through radial channel 108 flows through clutch plates 150 and 152, and dynamically balances piston 154 from rotational pressure effects of the fluid. Fluid flows out through radially inner gap 146 such that, during rotation of outer clutch carrier 138 (and piston 154 sealed to the outer clutch carrier), clutch pack chamber 157 is filled with fluid, aiding in dynamic balancing of piston 154.

Hybrid module 100 includes housing 102 and electric motor rotor 158. Radial channel 110 includes axial passage 116 open at radial wall 118 of bulkhead 104. Passage 116 is radially proximate electric motor rotor 158. Electric motor rotor 158 includes radially inwardly extending rim 160 disposed radially outside of the axial passage. Rim 160 is arranged to limit axial flow of fluid received from axial passage 116. In other words, flow from axial passage 116 may drip onto the rotor and rim 160 keeps the fluid on the rotor and prevents it from flowing back towards the bulkhead. Rim 160 radially overlaps passage 116 such that the fluid from the passage is caught by the rotor. Hybrid module 100 also includes electric motor stator 162 arranged radially outside of electric motor rotor 158 and fixed to hybrid module housing 102. Rotation of rotor 158 flings fluid radially outward via centrifugal dynamics to cool stator 162. Rotor 158 and stator 162 form electric motor 164.

Cooling circuit 200 includes flow path 202 providing a fluid to clutch pack 166, and flow path 204 providing the fluid from the clutch pack to electric motor 164. Flow path 204 includes axial passage 116 radially proximate electric motor 164. The fluid provides a dynamic balancing to piston 154 for the clutch pack. In other words, flow path 202 provides the fluid to a release side of piston 154 to balance a dynamic effect from rotating apply-side fluid from channel 106. Cooling circuit 200 includes flow path 206 fluidically connecting paths 202 and 204, and at least partially formed by outer clutch carrier 138 and inner clutch carrier 144. That is, flow path 206 includes gap 146 between the carriers. Flow path 206 also includes groove 142 in bushing 140. Flow path 206 also includes axial passage 128 formed in clutch shaft 120 and radial passage 130 formed in clutch shaft 120. Radial passage 130 is axially aligned with flow path 204.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Hybrid module housing
104 Bulkhead
106 Radial channel (first, apply)
108 Radial channel (second, clutch cooling)
110 Radial channel (third, motor cooling)
112 Radially outer surface (bulkhead)
114 Plug
116 Axial passage
118 Radial wall (bulkhead)
120 clutch shaft
122 Seal (clutch shaft to bulkhead)
123 Bearing (clutch shaft to housing)
124 Damper
125 Spline (damper/clutch shaft)
126 Shaft channel
128 Axial portion (shaft channel, bore)
130 Radial hole (shaft channel)
132 Outer surface (clutch shaft)
134 Chamber (Shaft channel to third radial channel)
136 Seal (housing to clutch shaft)
138 Outer clutch carrier 140 Bushing
142 Flow groove (bushing)
144 Inner clutch carrier
146 Gap (outer/inner clutch carrier)
148 Rotor carrier
150 Clutch plates (outer carrier)
152 Clutch plates (inner carrier)
154 Piston
156 Bolt (combustion engine to damper)
157 Clutch pack chamber
158 Electric motor rotor
160 Rim (electric motor rotor)
162 Electric motor stator
164 Electric motor
166 clutch pack
200 Cooling flow path
202 Flow path (first)
204 Flow path (second)
206 Flow path (third)

What is claimed is:

1. A hybrid module housing, comprising:
a bulkhead comprising:
   a first radial channel for providing a clutch apply pressure;
   a second radial channel for providing a clutch cooling flow; and
   a third radial channel for providing a motor cooling flow.

2. The hybrid module housing of claim 1 wherein the third radial channel is arranged to be on a bottom half of the hybrid module housing when the hybrid module housing is installed in a vehicle.

3. The hybrid module housing of claim 1 wherein:
the first radial channel and the second radial channel are open at a radially outer surface of the bulkhead; and
the third radial channel is sealed at the radially outer surface of the bulkhead.

4. The hybrid module housing of claim 1 wherein the third radial channel comprises an axial passage open at a radial wall of the bulkhead.

5. A hybrid module comprising:
the hybrid module housing of claim 1; and
a clutch shaft sealed to the bulkhead.

6. The hybrid module of claim 5 further comprising a bearing radially supporting the clutch shaft on the hybrid module housing.

7. The hybrid module of claim 5 wherein the clutch shaft comprises a shaft channel in fluid communication with the third radial channel.

8. The hybrid module of claim 5 further comprising:
an outer clutch carrier; and
a bushing disposed radially between the outer clutch carrier and the clutch shaft.

9. The hybrid module of claim 8 wherein the bushing comprises a flow groove forming a portion of a flow path connecting the second radial channel to the third radial channel.

10. The hybrid module of claim 8 wherein:
the clutch shaft comprises an inner clutch carrier; and
a gap between the outer clutch carrier and the inner clutch carrier forms a portion of a flow path connecting the second radial channel to the third radial channel.

11. A hybrid module comprising:
the hybrid module housing of claim 1; and
an electric motor rotor, wherein the third radial channel comprises an axial passage open at a radial wall of the bulkhead and radially proximate the electric motor rotor.

12. The hybrid module of claim 11 wherein the electric motor rotor comprises a radially inwardly extending rim disposed radially outside of the axial passage.

13. The hybrid module of claim 11 further comprising an electric motor stator arranged radially outside of the electric motor rotor and fixed to the hybrid module housing.

14. A cooling circuit for a hybrid module comprising:
a first flow path providing a fluid to a clutch pack; and
a second flow path providing the fluid from the clutch pack to an electric motor, the second flow path comprising a first axial passage exiting a housing bulkhead of the hybrid module radially proximate the electric motor.

15. The cooling circuit of claim 14 wherein the fluid provides a dynamic balancing to a piston for the clutch pack.

16. The cooling circuit of claim 14 further comprising a third flow path fluidically connecting the first flow path and the second flow path and at least partially formed by an outer clutch carrier and an inner clutch carrier.

17. The cooling circuit of claim 16 wherein the third flow path further comprises a groove in a bushing.

18. The cooling circuit of claim 16 wherein the third flow path further comprises a second axial passage formed in a clutch shaft and a radial passage formed in the clutch shaft.

19. The cooling circuit of claim 18 wherein the radial passage is axially aligned with the second flow path.

* * * * *